(12) United States Patent
Calvert et al.

(10) Patent No.: US 7,415,401 B2
(45) Date of Patent: Aug. 19, 2008

(54) METHOD FOR CONSTRUCTING 3-D GEOLOGIC MODELS BY COMBINING MULTIPLE FREQUENCY PASSBANDS

(75) Inventors: Craig S. Calvert, Houston, TX (US); Glen W. Bishop, LaPorte, TX (US); Yuan-zhe Ma, The Woodlands, TX (US); Tingting Yao, Pearland, TX (US); J. Lincoln Foreman, Houston, TX (US); Keith B. Sullivan, Houston, TX (US); Dwight C. Dawson, Spring, TX (US); Thomas A. Jones, Bellaire, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1630 days.

(21) Appl. No.: 09/934,320

(22) Filed: Aug. 21, 2001

(65) Prior Publication Data
US 2002/0042702 A1    Apr. 11, 2002

Related U.S. Application Data

(60) Provisional application No. 60/229,407, filed on Aug. 31, 2000.

(51) Int. Cl.
*G06G 7/50* (2006.01)
*G06G 7/48* (2006.01)
*G01N 15/08* (2006.01)
*G01V 1/16* (2006.01)
*G01V 1/00* (2006.01)
*G01R 23/02* (2006.01)

(52) U.S. Cl. .................. 703/10; 703/9; 702/13; 702/14; 702/17; 250/250; 367/38

(58) Field of Classification Search .............. 703/5, 703/9–10; 367/36–42, 73; 702/13–18; 700/38
See application file for complete search history.

(56) References Cited

U.S. PATENT DOCUMENTS

| | | | | |
|---|---|---|---|---|
| 3,631,384 A | * | 12/1971 | Smith, Jr. | 367/9 |
| 4,653,855 A | * | 3/1987 | Birnbach et al. | 324/310 |
| 4,679,174 A | * | 7/1987 | Gelfand | 367/73 |
| 4,710,876 A | * | 12/1987 | Cline et al. | 345/423 |

(Continued)

OTHER PUBLICATIONS

Brigham, E. Oran, 1974,"The Fast Fourier Transform", (Prentice-Hall, Inc., New Jersey), p. 6.

(Continued)

*Primary Examiner*—Kamini Shah
*Assistant Examiner*—Akash Saxena

(57) ABSTRACT

A process for constructing a three-dimensional geologic model of a subsurface earth volume wherein resolution scales of multiple diverse data types, including seismic data, are accounted for by generating multiple frequency passband models and combining them together to form the complete geologic model. Preferably, a model is generated for each of a low-frequency passband, a mid-frequency passband, and a high-frequency passband. When integrating seismic data into the modeling process, the seismic-frequency passband constitutes the mid-frequency passband model. The process further contemplates updating tentative frequency-passband models through optimization of assigned rock property values in each tentative model according to specified geological criteria. Such optimization is carried out by perturbation of the rock property values in a manner wherein the frequency content of each model is maintained.

29 Claims, 6 Drawing Sheets

U.S. PATENT DOCUMENTS

| | | | | |
|---|---|---|---|---|
| 4,821,164 | A | * | 4/1989 | Swanson ........................ 702/5 |
| 4,964,103 | A | * | 10/1990 | Johnson ........................ 367/53 |
| 5,132,938 | A | * | 7/1992 | Walters ........................ 367/38 |
| 5,229,940 | A | * | 7/1993 | Wang et al. .................... 702/16 |
| 5,451,164 | A | * | 9/1995 | Henderson et al. .......... 434/299 |
| 5,583,825 | A | * | 12/1996 | Carrazzone et al. ............ 367/31 |
| 5,642,327 | A | * | 6/1997 | Schiflett et al. ............... 367/47 |
| 5,729,451 | A | * | 3/1998 | Gibbs et al. ................... 702/12 |
| 5,838,634 | A | * | 11/1998 | Jones et al. .................... 367/73 |
| 5,870,691 | A | * | 2/1999 | Partyka et al. ................. 702/16 |
| 5,905,657 | A | * | 5/1999 | Celniker ........................ 703/5 |
| 5,937,362 | A | * | 8/1999 | Lindsay et al. ................. 702/9 |
| 5,940,778 | A | * | 8/1999 | Marfurt et al. ................. 702/16 |
| 5,995,904 | A | * | 11/1999 | Willen et al. ................... 702/14 |
| 5,995,906 | A | * | 11/1999 | Doyen et al. ................... 702/16 |
| 6,012,018 | A | * | 1/2000 | Hornbuckle ................. 702/16 |
| 6,018,497 | A | * | 1/2000 | Gunasekera ................. 367/72 |
| 6,049,759 | A | * | 4/2000 | Etgen ........................... 702/14 |
| 6,058,073 | A | * | 5/2000 | VerWest ....................... 367/31 |
| 6,078,334 | A | * | 6/2000 | Hanaoka et al. .............. 345/584 |
| 6,131,071 | A | * | 10/2000 | Partyka et al. ................. 702/16 |
| 6,374,201 | B1 | * | 4/2002 | Grizon et al. ................. 703/10 |
| 6,381,543 | B1 | * | 4/2002 | Guerillot et al. .............. 702/13 |
| 6,430,510 | B1 | * | 8/2002 | Thomas et al. ................ 702/14 |
| 6,446,007 | B1 | * | 9/2002 | Finn et al. ..................... 702/14 |
| 6,480,790 | B1 | * | 11/2002 | Calvert et al. ................. 702/14 |
| 6,519,532 | B2 | * | 2/2003 | Meng ........................... 702/17 |
| 2003/0115029 | A1 | * | 6/2003 | Calvert et al. ................. 703/10 |

OTHER PUBLICATIONS

David, Michel, 1997, "Geostatistical Ore Reserve Estimation", (Elsevier, New York), p. 364.

Deutsch, Clayton V. and Journel, Andre G., 1992, GSLIB: "Geostatistical Software Library and User's Guide", (Oxford University Press, New York), pp. 340-347.

Denver, Larry E. et al., Feb. 1990, "Stratigraphic Geocellular Modeling", (Geobyte), pp. 45-47.

Denver, Larry E. and Phillips, Danny C., 1992, "The Impact of Vertical Averaging on Hydrocarbon Volumetric Calculations-A Case Study", (Amer. Assoc. Petroleum Geology, Tulsa), pp. 219-234.

Hardy, H. H. and Beier, R. A., 1994, "Integration of Large—and Small-Scale Data Using Fourier Transforms", (ECMORIV Conference, Roros, Norway), pp. 1-20.

Huang, Xuri and Kelkar, Mohan, 1996, "Integration of Dynamic Data for Reservoir Characterization in the Frequency Domain", SPE 36513, (SPE Annual Tech. Conf. and Exhib., Colorado), pp. 209-219.

Jones, Thomas A., 1988, "Modeling Geology in Three Dimensions", (Geobyte), pp. 14-20.

Pendrel, J. V. and Riel, Paul V., 1997, "Estimating Porosity from 3D Seismic Inversion and 3D Geostatistics", (6th Ann. Int'l Mtg. Soc. Expl. Geophys., Expanded Abstracts), pp. 834-837.

Sheriff, R. E. and Geldart, L. P., 1985, "Exploration Seismology—vol. II, Data Processing and Interpretation", (Cambridge University Press, Cambridge), pp. 188-189.

Torres-Verdin, Carlos, et al., Mar. 1999, "Trace-Based and Geostatistical Inversion of 3-D Seismic Data for Thin-Sand Delineation: An Application in San Jorge Basin, Argentina", (The Leading Edge), pp. 1070-1077.

Yao, Tingting, 1998, "Conditional Spectral Simulation with Phase Identification" (Mathematical Geology, vol. 30., No. 3), pp. 285-308.

Yao, Tingting, 1999, "Scale Matching with Factorial Kriging for Improved Porosity Estimation from Seismic Data", (Mathematical Geology, vol. 31, No. 1) pp. 23-46.

* cited by examiner

METHOD FOR CONSTRUCTING 3-D GEOLOGIC MODELS BY COMBINING MULTIPLE FREQUENCY PASSBANDS

This application claims the benefit of U.S. Provisional Application No. 60/229,407 filed Aug. 31, 2000.

BACKGROUND OF THE INVENTION

1. Field of the Invention

This invention generally relates to geologic-modeling. More specifically, this invention relates to a three-dimensional geologic modeling technique wherein multiple frequency-passband model units are combined together to form the complete geologic model.

2. Description of the Prior Art

A. Geologic Modeling

As used in the context of the present invention, a geologic model is a computer-based representation of a region of the subsurface, such as a petroleum reservoir or a depositional basin. A geologic model may take on many different forms. Most commonly, descriptive or static geologic models built for mining or petroleum applications are in the form of a three-dimensional array of individual model units or blocks (also referred to as cells) or less commonly points. Hereafter, geologic models will be referred to in terms of blocks. The entire set of blocks constitutes the geologic model and represents the subsurface volume. Each block represents a unique portion of the subsurface, so the blocks may not intercut each other. Dimensions of the blocks should be chosen so that the rock-properties assigned to each block (e.g., lithology, porosity, acoustic impedance, permeability, and water saturation) are relatively homogeneous within a block, yet without creating an excessive number of blocks. Most commonly, blocks are square or rectangular in plan view and have thickness that is either constant or variable, but any shape may be used.

The geologic modeling process assigns values of the rock-properties of interest to all blocks within the geologic model, which is a process known to practitioners of geologic modeling. The value that is to be assigned to the block is calculated using one of many estimation methods, though the most common methods used are geostatistical. Geostatistical methods take into account spatial continuity of the rock property. The three-dimensional continuity of a rock property may be captured by a variogram, which quantifies the spatial variability of the rock property as a function of both separation distance and direction. Also, the model is generally constrained by stratigraphic or structural surfaces and boundaries (e.g., facies changes) that separate regions of different geologic and geophysical properties. The geologic or geophysical data and interpretations that are integrated into the geologic model come from many different sources, including core, wireline logs, outcrop analog, and 2-D or 3-D seismic data.

B. Geostatistical Methods of Geologic Modeling

Deterministic geostatistical methods, such as kriging, are averaging methods that assign weights to the neighboring data as a function of distance from the estimation block and the variogram model. Stochastic geostatistical methods, such as sequential-Gaussian simulation and sequential indicator simulation, generate geologic models that honor desired heterogeneity. The estimation process first uses a deterministic method (e.g., kriging) to produce a conditional distribution of possible values of the rock property for the block. Monte Carlo sampling of this distribution is used to select the value of the property to assign. Since the order in which blocks are estimated affects rock property assignment, a 3-D random path typically is used. This process can generate a suite of geologic models for the property being modeled.

C. Frequency-Domain Description of Data and Spatial Scales

The spatial heterogeneity of rock-properties within a petroleum reservoir has a large effect on fluid flow. Reservoir heterogeneity can be described over a wide range of spatial scales. Each data source that is integrated into the geologic model represents a specific scale of information. For example, well data generally provide finer-scale information than do seismic data. The proper integration of different data types into the geologic model should account for the scale of information represented by each type. Because spectral frequency is a representation of scale in the space domain, it is useful to consider the frequency content of the input data when building the geologic model. Short-range or fine-scale variability in the reservoir corresponds to high-frequency heterogeneity, whereas long-range or coarse-scale variability corresponds to low-frequency heterogeneity. These different scales of information can be described in the frequency domain (also known as the "spectral" domain).

It can be shown that random functions such as 1-D well log or a 3-D geologic model can be decomposed into a sum of sinusoids, each representing a different frequency and unique amplitude. This decomposition is accomplished using the Fourier transform and results in a composite amplitude spectrum 10 (see FIG. 1) which is a plot of amplitude as a function of frequency. A defined frequency band representing a specific spatial scale can be filtered from this composite spectrum in the frequency domain. A typical and well-known low-pass filter is the Butterworth filter which is characterized by a cutoff frequency and a slope (frequency taper) above the cutoff frequency. This filter is easily converted to either band-pass or highpass filter types. The low-pass filter is specified from 0 to f1 Hz resulting in low-frequency band 12, the band-pass filter from f1 to f2 Hz resulting in mid-frequency band 14, and the high-pass from f2 to Nyquist frequency (theoretical maximum frequency for a given data sample rate) resulting in high-frequency band 16, where f1 and f2 represent user defined cutoff frequencies.

The Fourier transformation of a random function also results in phase information. Phase information contains data relating to the spatial distribution of values, whereas the amplitude spectrum contains information about spatial variability of values.

D. Modeling Technologies Which Account for Variations in Spatial Scale

Several geostatistical methods known to practitioners of geologic modeling attempt to account for variations in different scales of heterogeneity. The most basic method is termed "kriging with a trend," by which the geologic model is represented as the sum of a trend (low-frequency) component and a residual (high-frequency) component. The trend is generally modeled as a smoothly varying deterministic component, and the residual component is modeled as a stationary random field with zero mean.

Factorial kriging is a method related to kriging with a trend, except that the model is represented as the sum of one or more independent stochastic components. Each component corresponds to one structure of the variogram model specific to a certain spatial scale. Factorial kriging can be considered as a process to decompose spatially correlated data (e.g., well log, seismic data, or a geologic model) into a number of independent components, each of which can be filtered from the original data. Filtering occurs in the space domain (seismic time or depth) instead of the frequency domain.

Kriging with a trend and factorial kriging demonstrate a number of deficiencies and disadvantages. One such disadvantage is identifying components of the data. With factorial kriging, it may be difficult to identify components that have a physical interpretation, for example, to identify the component that exactly represents the spatial scale of the seismic data. Second, with the geostatistical methods each component is modeled deterministically. Third, the geostatistical methods assume that each component is independent of all other components, i.e., they are modeled separately and summed together to form the complete geologic model.

The application of the Fourier transform (or fast Fourier transform) has also been used to isolate (filter) individual spatial components so that they can be modeled individually. The Fourier transform converts stationary data from the space domain into an amplitude spectrum in the frequency domain. Different data sources represent different frequency ranges in the composite spectrum. Merging spectra from different data sources can generate a composite spectrum. The inverse Fourier transform of this composite spectrum will directly yield a version of the integrated result in the space domain (e.g. a geologic-model realization).

For example, a Fourier transform method has been applied to integrate static information from geologic interpretations (e.g., from seismic data) with dynamic information from well tests. (Huang and Kelkar, Integration of Dynamic Data for Reservoir Characterization in the Frequency Domain, Proceedings of the SPC Technical Conference and Exhibition, Denver, Colo., Pages 209-219, Oct. 6-9, 1996.) This method assumes that static interpretations represent low-frequency information whereas well-test data represent high-frequency information. This high-frequency information was optimized in the frequency domain to agree with the measured data. With this process, an initial geologic model of permeability (generated with static data) was converted to the frequency domain using the Fourier transform. The spectrum of a defined high-frequency component was perturbed and the composite spectrum then converted back to the space domain using the inverse Fourier transform. Pressure and production rate were simulated for the resulting geologic model and these estimates were compared with measured values using a simulated-annealing algorithm. If convergence was not met, the process was repeated; otherwise, it was terminated.

Prior art technologies that apply the Fourier transform or FFT to account for spatial scales in modeling demonstrate a number of deficiencies and disadvantages. One such disadvantage is that model perturbations are performed in the amplitude spectrum in the frequency domain. It is much more difficult to control the effect of the perturbation when it occurs in the frequency domain than in the space domain. In addition, the model cannot easily be conditioned to well data when perturbation occurs in the frequency domain. Second, the process of merging spectra of different components to form a composite spectrum assumes that the individual components are independent of all other components.

Seismic-inversion methods for characterizing a given geology must also account for spatial scale. It is understood by practitioners of seismic inversion that information on the low-frequency spatial distribution of acoustic impedance in the subsurface is absent in frequency band-limited seismic data. However, a low-frequency acoustic impedance component can often be obtained independently using measurements from well data or seismic stacking velocities, or possibly through inference from seismic-stratigraphic or seismic-facies interpretations. This low-frequency component can be merged with the seismic-frequency information to provide maps or models of acoustic impedance. For example, in studies by Pendrel and Van Riel (Estimating Porosity from 3D Seismic Inversion and 3D Geostatistics, 6th Annual International Meeting of the Society of Exploration Geophysicists, Expanded Abstracts, Pages 834-387, 1997) and Torres-Verdin et al. (Trace-based and Geostatistical Inversion of 3D Seismic Data for Thin-Sand Delineation: An Application in San Jorge Basin, Argentina, The Leading Edge, September, 1999, Pages 1070-1077), the low-frequency component was derived by interpolation of well-impedance data filtered to an appropriate bandwidth. The resulting low-frequency component was then merged with the seismic data that had been inverted to a model of frequency band-limited acoustic impedance.

Seismic-inversion methods are generally deficient for purposes of geologic modeling because they result in models of acoustic impedance only and contain no information at finer resolution than seismic scale. In addition, these methods assume that the seismic-frequency and low-frequency components are independent sources of information.

E. Deficiencies of the Prior Art Modeling Techniques

Prior art geologic modeling technologies do not properly account for different spatial scales of multiple diverse data types. As such, inaccuracies in the geologic model can result. Use of an inaccurate model may be very costly, resulting in inaccurate estimates of hydrocarbon reserves, missed hydrocarbon-reservoir targets, and inappropriate reservoir-development strategies.

Most prior art geologic-modeling technologies fail to recognize that different data types used in constructing the model contain information at different scales and frequency content. This deficiency is particularly true when integrating seismic information into the geologic model. Seismic-amplitude data do not contain significant low-frequency information. As a consequence of omitting this information, seismic data do not directly measure absolute rock property values nor generally measure slowly varying trends in these properties, e.g., as a result of burial compaction. For example, seismic data may be used to estimate porosity values within a reservoir, though these values may be strongly influenced by a slowly varying compaction trend. Direct integration of these estimates into the model without also integrating the low-frequency information will lead to inaccuracies.

Seismic-amplitude data also do not contain significant high-frequency information. As a consequence of omitting this information, seismic data measures properties over volumes of the subsurface which are much coarser than that measured by well data. For example, most prior-art geologic-modeling techniques assume that the rock-properties estimated from the seismic data and integrated into the geologic model represent a volume that is no different than that measured by the well data. If these estimated properties are integrated directly into the geologic model, the result might not properly reflect the high-frequency heterogeneity that occurs in the reservoir and that affects simulated fluid flow.

As previously discussed, some geologic-modeling technologies attempt to account for the different spatial scales of multiple diverse data types. Some of these technologies construct the model in the space domain, while others construct it in the frequency domain. Deficiencies in these methods include an inability to identify spatial components that have physical interpretations, a difficulty in controlling model perturbations, and, most notably, an assumption that the individual spatial components are independent sources of information.

For example, if shale volume (VSH) is modeled by summing multiple spatial components, the sum of all components can never exceed 100% because this would represent a physical impossibility since the total value would exceed 100%. If all spatial components are generated independently and summed to produce the complete geologic model, there is a good probability that shale volume will exceed 100% at several locations within the model. Therefore, each component is not independent of all other components.

SUMMARY OF THE INVENTION

The present invention provides a geologic modeling method wherein different resolution-scale data types are integrated. In accordance with the method, one or more frequency-passband models are constructed, combined, and then optimized to form the complete geologic model. The method provides the model builder with the ability to integrate multiple data types with greater accuracy.

One embodiment of the method involves constructing the complete geologic model by combining low-frequency, seismic-frequency, and high-frequency-passband models. For example, as illustrated in FIG. 2, a shale-volume model may be represented by one frequency-passband model for information measured at the seismic-frequency band (e.g., 20-56 Hz), a second frequency-passband model for information below seismic frequency (e.g., 0-20 Hz), and a third frequency-passband model for information above seismic frequency (e.g., >56 Hz). In combination, these models represent all frequencies in the complete shale-volume model. A more general embodiment of the method involves constructing the geologic model from one or more frequency-passband models that can represent any frequency passband, including a full-frequency band (>0 Hz).

In practicing the method, initial models, built in either time or depth, may be constructed for each of the frequency-passband models. An initial complete geologic model is constructed by combining the individual frequency-passband models. The initial complete geologic model is then optimized based on various desired criteria, either directly by optimizing the initial complete geologic model, or indirectly by optimizing one or more of the initial frequency-passband models that combine to result in the initial complete geologic model. These initial models may be optimized by assessing the match between calculated statistics that describe the characteristics of the rock-property values assigned to each initial model and the desired rock-property values. If the match is not within specified limits, perturbation of the rock-property values in at least one of these initial models is made using any one of several known numerical algorithms. The assessment of the match between the model values and the desired values and further perturbation continues until the model values are within specified limits.

In constructing the geologic model using the approach of the present invention, several different rock properties may be modeled independently or simultaneously. These properties include, but are not limited to, porosity, shale volume, net sand percentage, net pore volume, hydrocarbon saturation, hydrocarbon pore volume, and impedance.

BRIEF DESCRIPTION OF THE DRAWINGS

The present invention and its advantages may be more easily understood by reference to the following detailed description and the attached drawings in which.

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF A GENERAL EMBODIMENT

Figure 1:
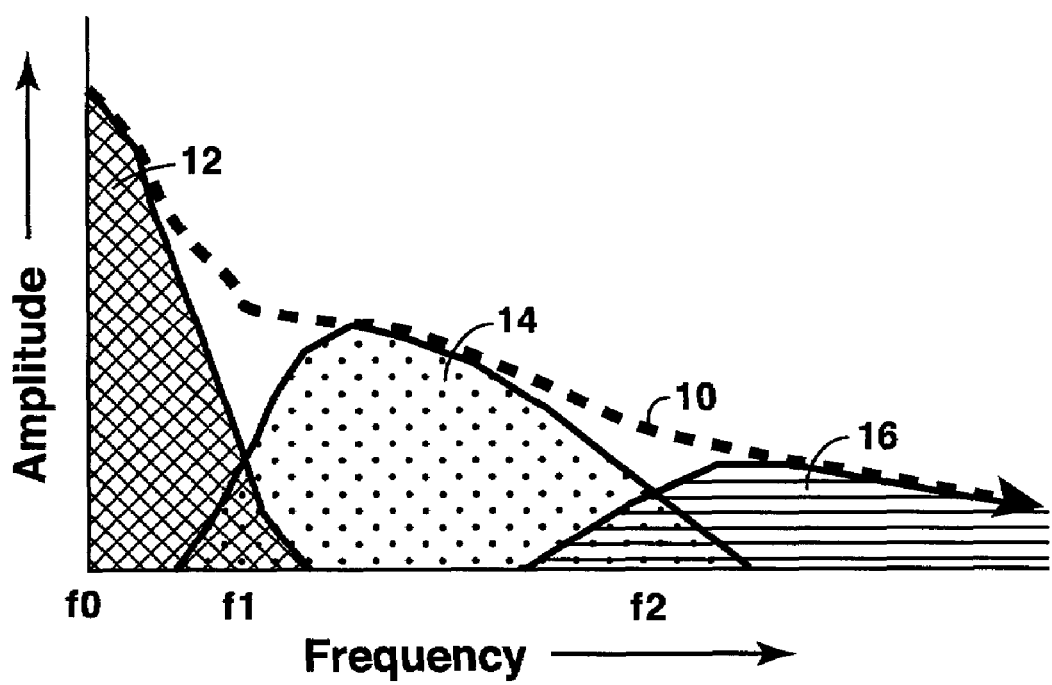
FIG. 1 illustrates the low-frequency, mid-frequency, and high-frequency passbands in a plot of amplitude versus frequency.
Figure 2:
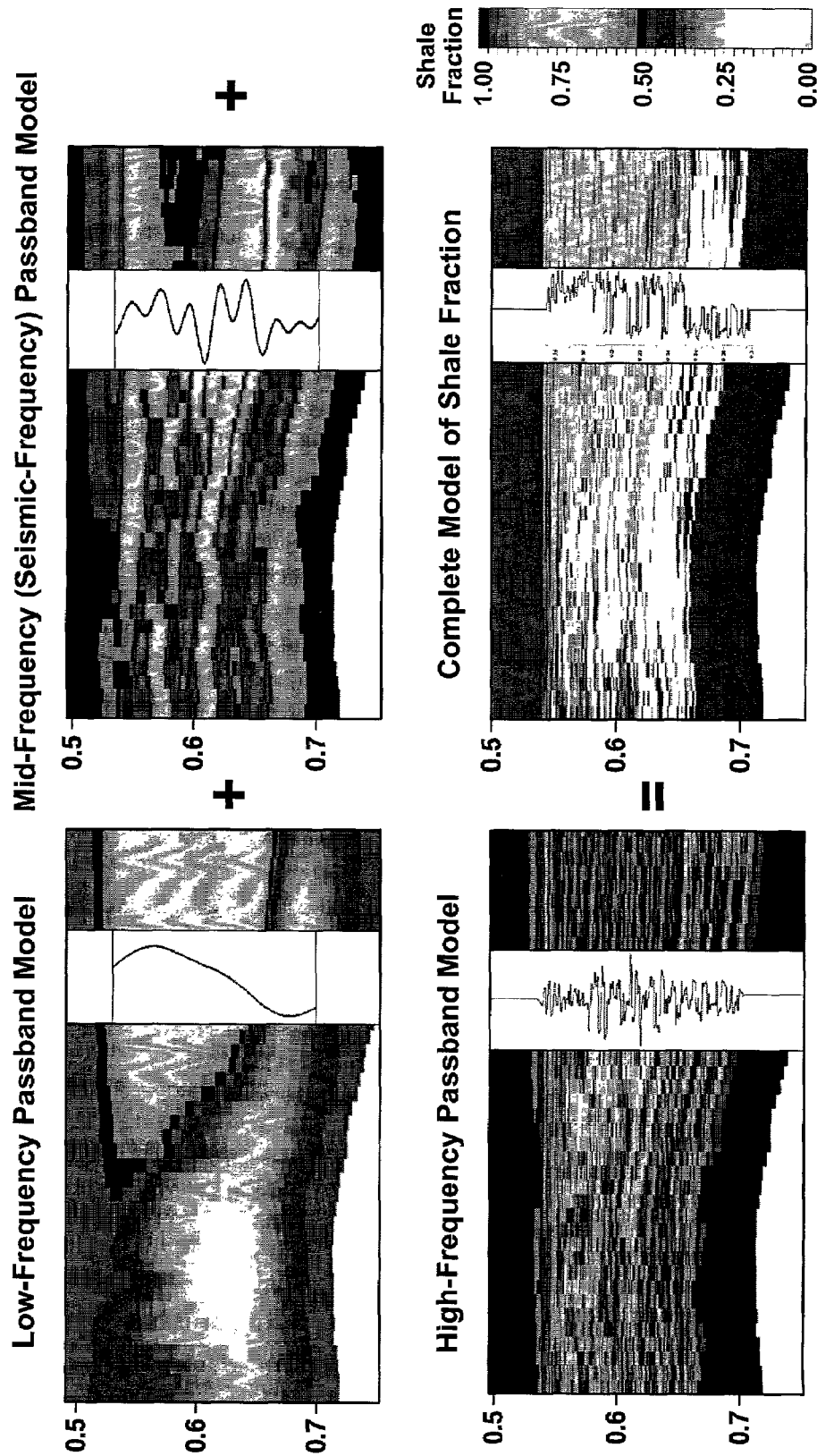
FIG. 2 illustrates a cross-section through a geologic model in accordance with the general embodiment of the present invention and wherein three initial frequency-passband models are constructed and combined to form the initial complete geologic model of the subsurface earth volume.
Figure 3:
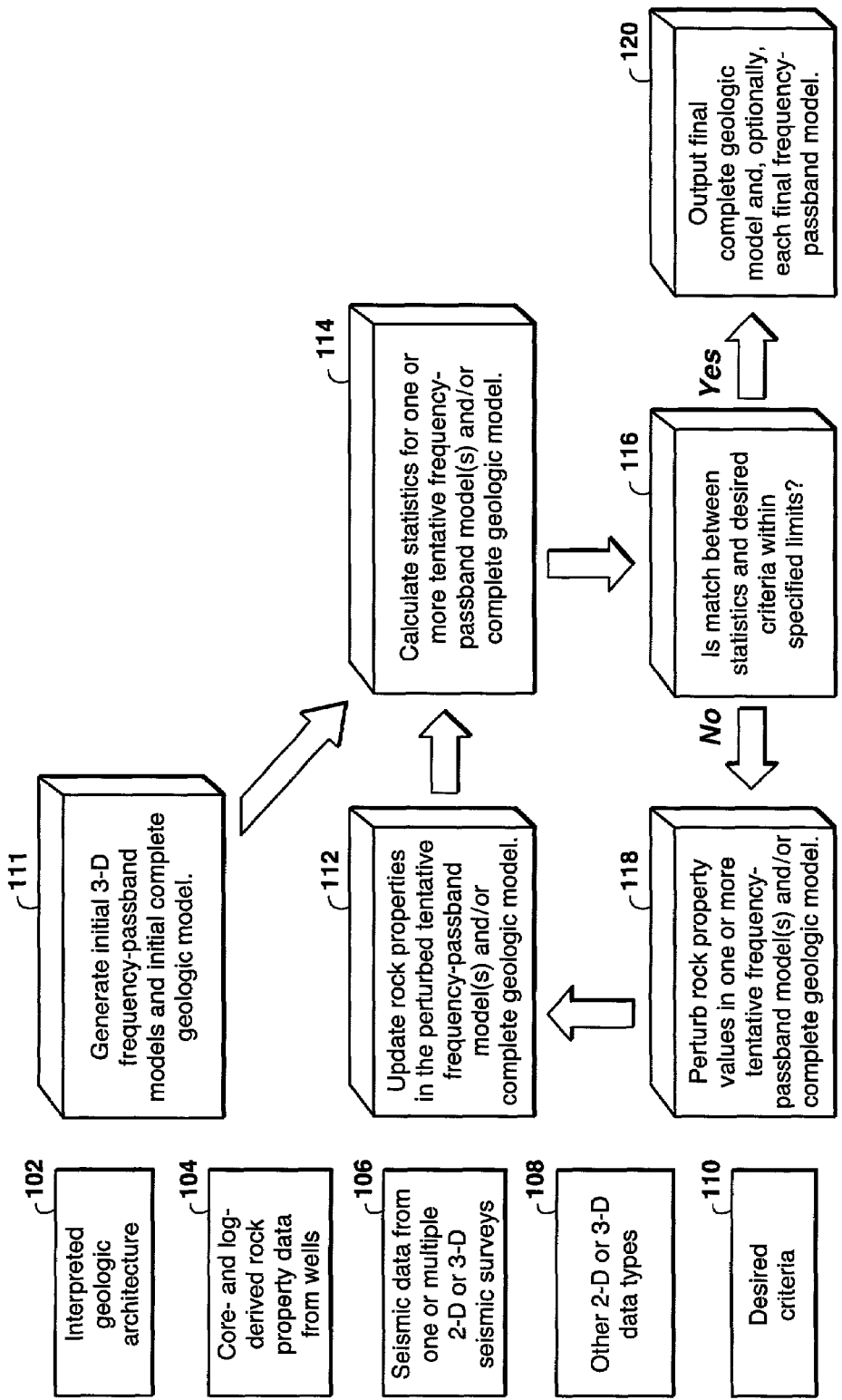
FIG. 3 summarizes the steps involved in practicing a general embodiment of the geologic modeling method of the present invention and the types of data that may be used.

With reference to FIG. 3, the geologic modeling method of the present invention involves integrating different resolution-scale data types by constructing one or more initial frequency-passband models, combining these initial models to form an initial complete geologic model, and then optimizing one or more of these initial models to form the final complete geologic model. This is done using data which includes interpreted geologic architecture 102 that defines the limits of the model, regions within the model and stratigraphic correlations within the model, and desired criteria 110 that define the distributions and relations of rock properties in the complete geologic model and/or one or more of the individual frequency-passband models. Optionally, and desirably, several data types may be used in constructing the initial frequency passband models, including rock property data 104 derived from core and well logs, seismic data 106 derived from seismic surveys, and other data types 108 that could be used to indicate distributions of rock properties within the model.

The initial frequency-passband models 111 are generated by assigning at least one rock property value to all model blocks within each model. The initial complete geologic model, in either seismic time or depth, is constructed by mathematically combining all frequency-passband models. The rock properties assigned to blocks may include, but are not limited to, porosity, shale volume, net sand percent, net pore volume, hydrocarbon saturation, hydrocarbon pore volume, impedance or permeability. This step may be done in any convenient way, though the frequency content of the rock properties assigned to each initial frequency-passband model should be consistent with the frequency band represented by that model and results may be improved if the initial models are consistent with desired criteria.

If each initial frequency-passband model represents a frequency band that does not overlap with the frequency band of any other initial frequency-passband model, then the initial complete geologic model can be constructed by summing all frequency-passband models. If, however, multiple initial frequency-passband models have overlapping frequency bands, special consideration must be given to correctly combining them together to obtain the initial complete geologic model. One method of combining such models is to perform the combination as a weighted-summation in the frequency domain. Weights are specified as a function of frequency for each initial frequency-passband model. This can be simplified somewhat by assigning a global weight such that all frequencies within the passband of a given initial model have the same assigned weight (global value) and have zero weight outside this band. These weights represent the relative contribution for each initial model during the summation process. For example, given n initial frequency-passband models with weights provided as a function of frequency for each model, the equation that represents the summation process in the frequency domain is as follows:

$$GMinit(f) = \left(\frac{1}{\sum_{i=1}^{n} W_i(f)}\right) \sum_{i=1}^{n} [W_i(f)][FPBMinit_i(f)], \quad (1)$$

where GMinit(f) is the initial complete geologic model as a function of frequency, FPBMiniti(f) is the ith initial frequency-passband model as a function of frequency, and Wi(f) are the frequency weights for the ith initial frequency-passband model.

After the initial models are generated, calculations 114 are made of statistics that describe the characteristics of rock properties in one or more of these models. These characteristics describe, for example, the spatial attributes of the tentative rock-properties within the models. These calculated statistics might be based on various criteria such as rock-property frequency distributions and two-point variograms.

Next, the match 116 between the calculated statistics and the desired criteria (e.g., desired rock-property frequency distributions) is assessed. If the match is not within specified limits, the rock-property values are perturbed at 118. The rock property values in at least one of the initial models are perturbed using any of a number of numerical algorithms known to persons skilled in the art of geologic modeling, including techniques of geostatistics or numerical optimization. It is also appreciated that the tentative geologic model is the combination of all individual tentative frequency-passband models. Therefore, perturbation of any one frequency-passband model will result in a simultaneous perturbation of the complete geologic model.

Figure 4:
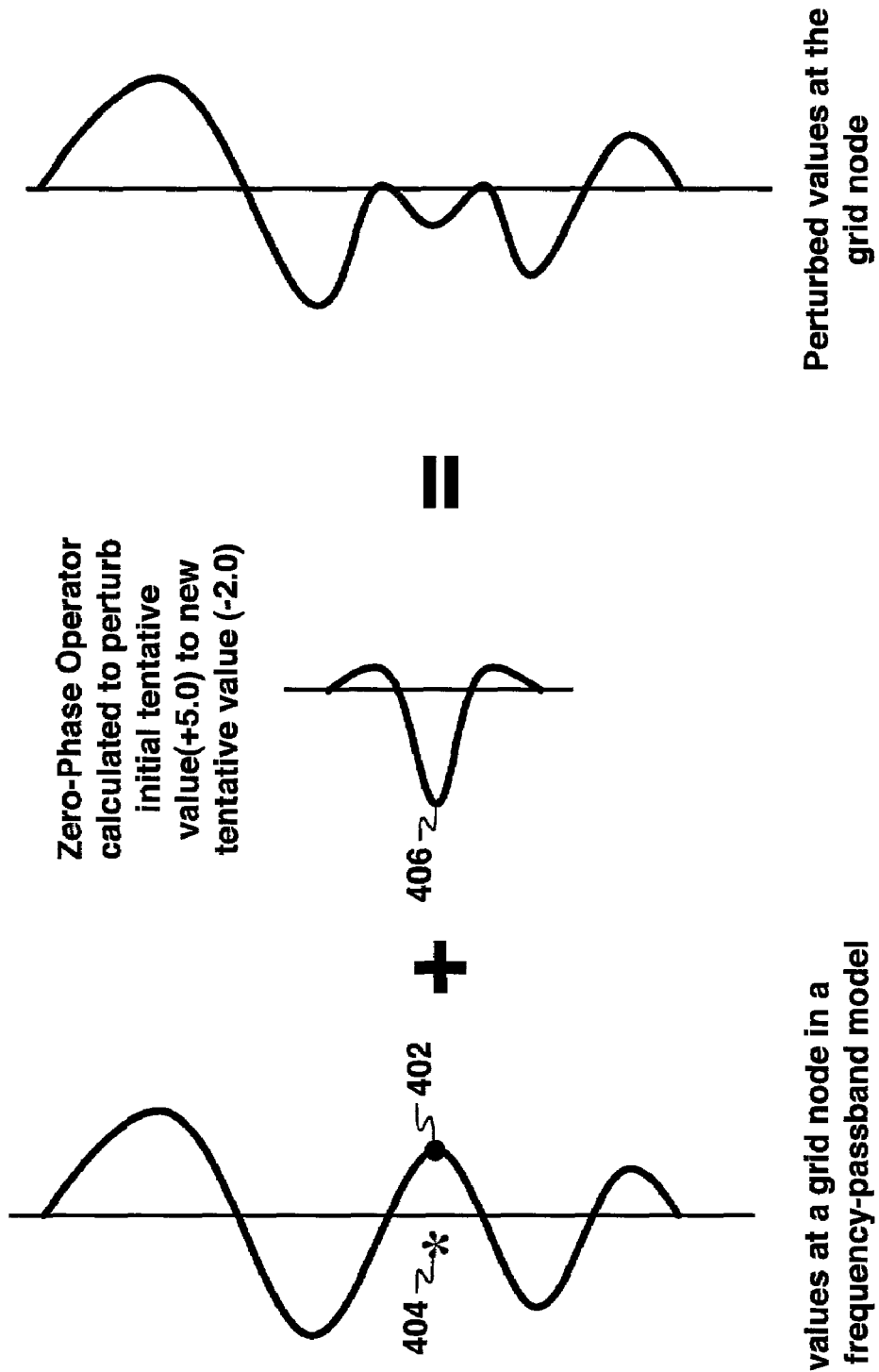
FIG. 4 illustrates the operation of perturbing rock property values in a tentative frequency-passband model to produce new values wherein a zero-phase operator is calculated and added to the tentative values.

If one or more of the initial frequency-passband models are optimized, it is to be recognized that the process of perturbation could have the undesired effect of altering the frequency content of the frequency-passband model. Many different approaches can be followed to insure that the frequency content of each model is maintained. One approach is to use the statistics representing the frequency content of each model in assessing the match to the desired criteria. Another approach is to apply a frequency bandpass filter to each perturbed frequency-passband model. A further approach is to calculate a zero-phase operator to be added to the tentative rock-property value with each perturbation. This approach is illustrated in FIG. 4 and may be realized by first calculating a zero-phase operator that is specific to a particular frequency passband. The operator is normalized so that its maximum value equals 1.0. Then, the tentative rock-property value 402 is perturbed by selecting a new tentative value 404, a delta value 406 is calculated by subtracting the initial tentative value 402, from the new value 404, and the normalized zero-phase operator is multiplied by this delta value 406. Yet another approach is to replace the tentative amplitude spectrum with a desired amplitude spectrum after one or several perturbations (See, Yao, T., Conditional Spectral Simulation With Phase Identification, Mathematical Geology, Vol. 30, No. 3, Pages 285-308, 1998). Desired amplitude spectra can be calculated from a desired variogram model or from a training image having the desired amplitude spectrum.

Following perturbation of the rock-property values, the rock-property values in the tentative complete geologic model and/or frequency-bandpass models are updated at 112. Statistics are calculated at 114 and the match is then assessed again at operation 116. If the match is not within specified limits, the operations illustrated at 118, 112 and 114 are repeated. If the match is within specified limits, the final complete geologic model and optionally each final frequency-passband model is output to a file at operation 120.

The process illustrated in FIG. 3 to update the tentative models is one of optimization. The optimization may be quantitatively based on mathematical functions using stochastic or deterministic methods, or may be qualitatively based. The statistics chosen to describe the rock properties within the models are not restricted and may be any convenient form that specifies the desired properties. The perturbations are carried out using any of several numerical algorithms known to persons skilled in the art of geologic modeling. Also, the operations set forth in FIG. 3 are preferably automated with the use of a computer.

DETAILED DESCRIPTION OF A PREFERRED EMBODIMENT

In a preferred embodiment of the invention, one or more initial frequency-passband models are constructed and combined to form an initial complete geologic model. Also, while one or more of the initial frequency-passband models may be updated by optimization, in the preferred approach only the complete geologic model is perturbed and optimized. This preference assumes that the additional effort to optimize one or more of the frequency-passband models will not be justified for most applications.

Preferably, the geologic modeling method is automated with the use of a computer. Automation eliminates the need for manual, iterative interpretation, thus achieving the desired complete geologic model sooner and with less effort. Automation also enhances the ability to realize an objective and reproducible model. Persons skilled in the art of geologic modeling are able to develop computer software for practicing the method based on the teachings set forth herein and particularly based on the information provided in FIGS. 5A and 5B. The preferred embodiment of this invention, as described below, may be applied to the entire geologic model or to a specific region within the geologic model.

Figure 5A:
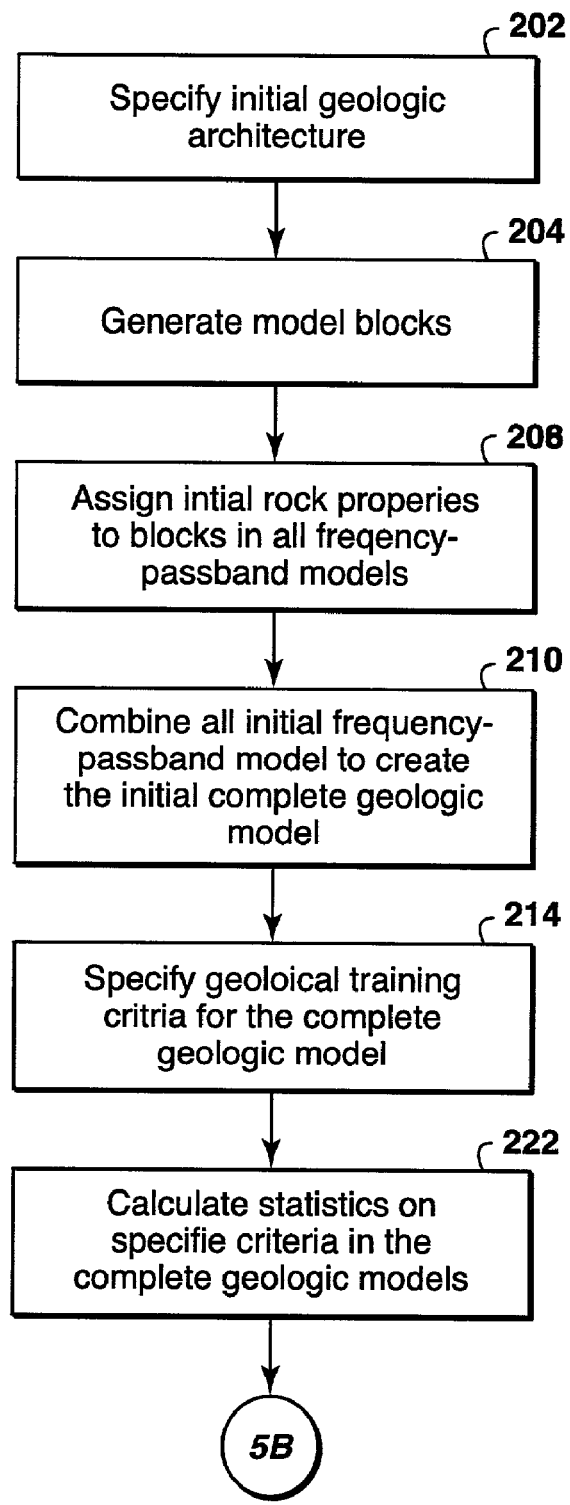
FIGS. 5A and 5B illustrate in detail the steps of a preferred embodiment of the geologic modeling method of the present invention.

Referring first to FIG. 5A, the method begins at operation 202 with the input of data specifying an initial geologic architecture to define the limits of the model, regions within the model and stratigraphic correlations within the model. In operation 204, model blocks are generated. This involves creation of an array of three-dimensional blocks that comprise the frequency-passband models and the complete geologic model. In operation 204, the blocks cannot overlap and must jointly describe the total volume of the subsurface region being modeled. At this stage of the method, each block has been assigned a position and a volume in the subsurface region. However, rock properties have not been assigned to any of these models.

Operation 208 involves preparation of the initial frequency-passband models for each rock property. The frequency content of the rock properties assigned to each initial frequency-passband model should be consistent with the frequency band represented by that model and, preferably, the initial models are somewhat consistent with desired criteria that control the modeling method in the operations to follow.

As an example of operation 208, possible approaches for constructing initial frequency-passband models of porosity include, but are not restricted to, the following procedures:

(a) A low-frequency-passband model may be constructed by assigning to blocks average porosity values for defined regions in the model, based on interpretations of geology for these regions, and then filtering this model to obtain the appropriate low-frequency content. Or, generating a simple geostatistical model of porosity conditioned to well data, and then filtering this model to obtain the appropriate low-frequency content.

(b) A seismic-frequency-passband model may be constructed by transforming seismic-amplitude values to seismic-frequency (bandlimited) porosity values, using a transform that statistically relates these properties. Bandlimited-porosity values could be calculated by filtering porosity values derived by wireline log over the seismic-frequency passband.

(c) A high-frequency-passband model may be constructed by generating a simple geostatistical model of porosity conditioned to well data, and then filtering this model to obtain the appropriate high-frequency content.

(d) A full-frequency-passband model may be represented by an existing geologic model of porosity for the subsurface region being modeled.

In operation 210, all initial frequency-passband models are combined to create the initial complete geologic model. If there is only one initial frequency-passband model, this model alone represents the initial complete geologic model. As an example of operation 210, possible approaches for combining multiple frequency-passband models for constructing an initial complete geologic model of porosity include, but are not restricted to, the following procedures:

(a) The initial complete geologic model may be constructed by summing three initial frequency-passband models of porosity: an initial low-frequency passband model containing information below seismic frequency (e.g., 0-20 Hz), an initial seismic-frequency passband model containing information within the seismic-frequency band (e.g., 20-56 Hz), and an initial high-frequency-passband model containing information above seismic frequency (e.g., >56 Hz).

(b) The initial complete geologic model may be constructed by substituting seismic-frequency-band information contained within an initial full-frequency passband model with an initial seismic-frequency-passband model. The initial full-frequency passband model is an existing geologic model of porosity. The initial seismic-frequency passband model contains porosity information within the seismic-frequency band (e.g., 20-56 Hz). Filtering is used to first remove information within the seismic-frequency band (e.g., 20-56 Hz) from the pre-existing geologic model. This filtered geologic model and the initial seismic-frequency passband model are then summed.

(c) The initial complete geologic model may be constructed by combining an initial full-frequency passband model with an initial low-frequency-passband model. The initial full-frequency passband model is an existing geologic model of porosity. The initial low-frequency passband model contains information within a low-frequency band (e.g., 0-10 Hz). Because the frequency passbands of the initial low-frequency passband model and the initial full-frequency passband model overlap, the initial complete geologic model may be constructed through a weighted-summation in the frequency domain. Weights are specified as a function of frequency for both the initial low-frequency and full-frequency passband models, where the weights represent the relative contribution of each model during the summation process. The relationship for this summation procedure is provided in Equation 1.

In operation 214, training criteria, which establish rules for modeling the complete geologic model, are specified. Typical examples of desired criteria include measures of 3-D spatial continuity and frequency distributions of rock properties. Criteria may be unique for each region within the geologic model. Many of the desired criteria specified may be represented as components of the objective function, whereas other criteria may be used directly. Combining desired criteria into a mathematical objective function allows a comparison of desired values with those calculated from the tentative geologic model. It also summarizes the overall match between the geologic model and the desired criteria.

To further illustrate operation 214, training criteria specified when constructing a geologic model of porosity include, but are not restricted to, the following:

(a) The frequency distribution (histogram) of porosity to be found in the complete geologic model.

(b) The desired 3-D amplitude spectrum of porosity for the complete geologic model. This spectrum can be calculated from a desired variogram model, from a training image (e.g. an existing model of porosity), or from a combination of the two.

(c) Rock-property values measured at wells. These values are assigned as desired criteria within those model blocks intersected by these wells. This assignment operation consists of (i) determining which blocks are intersected by the boreholes of the wells and (ii) assigning the values observed at each intersected borehole segment to the corresponding blocks as desired criteria.

Though not a requirement of the preferred embodiment, multiple rock-properties may be simultaneously modeled. Separate initial complete geologic models must be constructed for each rock property and separate criteria for each rock property must be specified. In addition, criteria may be specified that define relationships between two or more of the rock properties being simultaneously modeled to ensure consistency between the models. For example, if a porosity value were assigned to a block, a permeability value consistent with that porosity value would be assigned to that same block. Such criteria may be defined in the form of constant parameters, straightline or curvilinear interpolators, or scatterplots (cloud transforms). Relationships may be unique for each defined region within the model.

It is necessary that the specified criteria be consistent with the frequency content of the particular model for which they are being used. For the preferred embodiment of this invention only the complete geologic model is perturbed and optimized; therefore, these criteria must be consistent with the frequency content of the complete geologic model.

Some desired criteria (e.g., a variogram model or the amplitude spectrum) are controlled by stratigraphic correlations. Accordingly, for stratigraphic statistics, correlations between blocks in the model should be taken into account. For instance, if a bed is dipping, the amplitude spectrum representing stratigraphic continuity should not be calculated horizontally, but instead the calculation should follow the degree and direction of dip; i.e., should follow the stratigraphic correlations. This approach should be followed when calculating all such stratigraphically controlled criteria. Correlative layers typically are defined by surfaces in the form of computer grids In operation 222, statistics to measure agreement of desired criteria are calculated. Preferably, desired criteria or criteria corresponding to the observations or training information are provided. Statistics are calculated from the properties in the initial complete geologic model and then are compared to the desired values. For example, consider a frequency distribution (histogram) for the property being modeled. By subdividing the histogram into multiple bins, each bin representing a narrow range in property values, a comparison statistic might be the sum of squares of the differences between the calculated, model-wide bin count (number of counts in each bin) and the desired bin count, with the sums calculated over all bins.

Figure 5B:
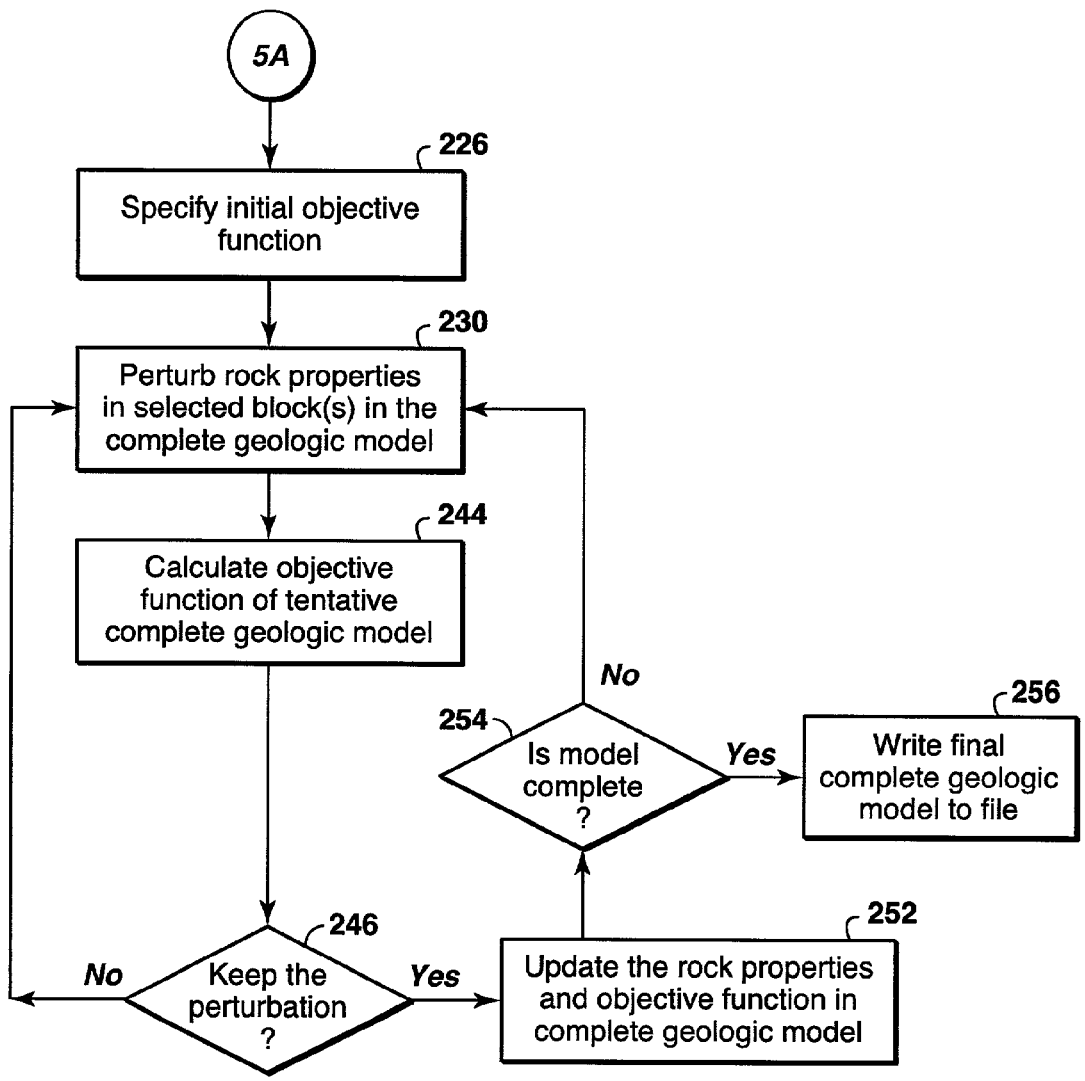

The method now proceeds from FIG. 5A to operation 226 as illustrated in FIG. 5B. In operation 226, the initial objective function is computed. One or more of the comparison statistics for the desired criteria from the complete geologic model are combined into an objective function. Although the objective function can be defined in many ways, typically it is in the form of a linear combination of the individual desired criteria:

$$OBJ = WiCOMi$$

where Wi represents a weight assigned to the i-th component, COMi, and the sum is over all components being used for building the model. Preferably, the components of the objective function are defined so as to make them nonnegative and to force them to reach an optimum value (perfect agreement) at zero. If this is done for all components, the objective function will have similar properties.

The preferred method of defining weights Wi associated with each component is to let Wi=Vi Ui, where Vi represents a weight that takes account the variability (e.g., inverse of the variance) of the component, and Ui is a user-defined, relative weight for the component. It is convenient to rescale the weights Wi so that OBJ=1.0 for the initial model.

In operation 230, the rock-property values assigned to blocks in the tentative complete geologic model are systematically perturbed. The optimization feature of the method requires perturbing the model's rock properties until the objective function attains a minimum value; that is until the comparison statistics reasonably match the desired criteria. Any of several optimization techniques can be used to determine if a given perturbation makes the model attain a better fit to the desired criteria. The preferred characteristics of the optimization technique are that properties of the individual blocks can be modified and an objective function can be defined to indicate degree of agreement.

Many different optimization techniques could be applied in this step, including simulated annealing, the maximum a posteriori method, Markov-chain Monte Carlo methods, gradient and other deterministic methods, and genetic algorithms, as well as a combination of algorithms. The method of the present invention is not limited to a specific optimization technique, though a specific technique may be preferred in a certain situation.

It is preferable to perform operation 230 in a series of sequential steps; wherein at each step, the perturbation process attempts to force a nearly perfect fit of the model statistics to one of the desired criteria. The objective function can be computed after each sequential step or after one iteration through all steps. As an example of operation 230, sequential perturbation steps for modeling porosity include, but are not restricted to, the following procedures:

(a) Blocks in the geologic model intersected by the boreholes of the wells are selected and tentative porosity values assigned to these blocks are replaced by the corresponding values observed at each intersected borehole segment.

(b) Tentative porosity values assigned to all blocks in the geologic model are simultaneously perturbed to new values using the rank-transform method. This method, known to persons skilled in the art of geologic modeling, resets the tentative cumulative frequency distribution of porosity calculated from the tentative geologic model to the desired cumulative frequency distribution of porosity. This step simultaneously perturbs rock property values in all blocks of the complete geologic model.

(c) The tentative complete geologic model is transformed into the frequency domain using the fast Fourier transform. The tentative 3-D amplitude spectrum for the geologic model is replaced, entirely or in part, with the desired amplitude spectrum. The 3-D phase spectrum for the tentative geologic model is not replaced. The inverse Fourier transform converts these spectra back into the space domain to yield an updated version of the complete geologic model. This step simultaneously perturbs rock property values in all blocks of the complete geologic model.

In operation 244, the objective function of the tentative complete geologic model is calculated and the tentative component statistics for geological criteria are combined into a tentative objective function that measures the degree of fit between properties in the tentative models and the desired properties. It is convenient to define the objective function in terms of a single component, which is a measure of the magnitude of change in rock-property values assigned to blocks in the tentative geologic model following each iteration.

In operation 246, the decision is made as to whether the tentative values in the blocks are to be retained or rejected. This decision depends on the value of the newly calculated objective function. If the tentative objective function is nearer the optimum than the current objective function, then the tentative perturbation is retained. In this case, the tentative rock property values are stored in the models in operation 252. Also, the objective function and components are changed to equal the tentative values. If operation 230 is performed in a series of sequential steps as described above, then the objective function is always reduced after each iteration and the tentative perturbation is always retained in operation 246.

With many optimization techniques, the objective function can increase following perturbation. If the objective function has increased, the values in the blocks and the objective function components will be left unchanged. If simulated annealing is applied, the tentative change may be allowed, with a small probability, to be retained regardless of the increase in the objective function. This will serve to prevent convergence from being trapped in a local minimum in the objective function space. Other optimization techniques may not allow increases in the objective function.

The method concludes in operations 254 and 256. In operation 254, a determination is made as to whether the model is adequate or complete. If it is not, the method continues by returning to operation 230 such that the blocks in the tentative complete geologic model continue to be perturbed. The process may be configured to stop perturbation if a preassigned number of perturbations have been attempted or if preassigned criteria of the objective function (e.g., minimum acceptable value) have been attained. If the model is complete, the final complete geologic model is written to file in operation 256. The resulting optimized model is then available for analysis, validation, and for geological, geophysical, or engineering applications with other software.

Although particular detailed embodiments of the present invention have been described herein, it should be understood that the invention is not restricted to the details of the preferred embodiments described. It will be apparent to persons skilled in the art that many alternatives, modifications, and variations to the embodiments described are possible without departing from the spirit and scope of the present invention.

What is claimed is:

1. A method for constructing a three-dimensional geologic model of a subsurface earth volume according to specific geological criteria, comprising the steps of:
   (a) generating an initial frequency-passband model of the subsurface earth volume for at least one frequency passband;
   (b) assigning values for at least one rock property in each initial frequency-passband model;
   (c) combining the initial frequency-passband models to form an initial complete three-dimensional geologic model of the subsurface earth volume; and
   (d) optimizing the initial complete three-dimensional geologic model by perturbing the rock property values in at least one of the models according to specified geological criteria.

2. The method of claim 1, wherein a tentative frequency-passband model is generated for at least one of a low-frequency passband, a mid-frequency passband, a high-frequency passband, and a full-frequency passband.

3. The method of claim 2, wherein a seismic-frequency passband represents the mid-frequency passband.

4. The method of claim 2, wherein an existing geologic model represents the full-frequency passband.

5. The method of claim 1, wherein the step of generating an initial model for a frequency passband comprises the steps of
   (a) specifying an initial geologic architecture to define the limits of the model, the regions within the model, and stratigraphic correlations within the model; and
   (b) creating a three-dimensional array of contiguous model blocks to represent all portions of the subsurface earth volume to be included within the model.

6. The method of claim 1, wherein the step of generating a initial model for a frequency passband comprises the steps of
   (a) specifying an initial geologic architecture to define the limits of the model, the regions within the model, and stratigraphic correlations within the model; and
   (b) creating a three-dimensional array of discrete model points to represent all portions of the subsurface earth volume to be included within the model.

7. The method of claim 1 wherein each rock property value is a measurable property of the subsurface volume selected from a group consisting of porosity, shale volume, net sand percent, net pore volume, hydrocarbon saturation, hydrocarbon pore volume, impedance, and permeability.

8. The method of claim 1, wherein a plurality of rock properties are assigned to each initial frequency-passband model.

9. The method of claim 1, wherein each assigned rock-property value is consistent with the frequency content of the corresponding initial frequency-passband model.

10. The method of claim 1, wherein the initial complete geologic model is formed from a single initial frequency-passband model.

11. The method of claim 1 wherein the initial complete geologic model is formed by summation of all initial frequency-passband models.

12. The method of claim 1, wherein the initial complete geologic model is formed by weighted summation of the initial frequency-passband models in the frequency domain.

13. The method of claim 1, wherein the step of optimizing the initial complete three-dimensional geologic model by perturbing the rock-property values comprises the steps of:
   (a) specifying training criteria for at least one initial model, said training criteria being consistent with the frequency content of the corresponding model;
   (b) calculating statistics that describe the characteristics of the assigned rock-property values in the at least one model;
   (c) calculating the initial objective function;
   (d) perturbing the rock-property values in the at least one initial model so that the rock-property values more closely correspond to the training criteria;
   (e) calculating the objective function for the new tentative model;
   (f) retaining the perturbed rock-property values and the new tentative objective function if the objective function is reduced;
   (g) repeating steps (d) through (f) until the objective function is reduced to a specified limit; and
   (h) outputting the final complete geologic model to file.

14. The method of claim 13, comprising the further step of:
   (a) outputting each final frequency passband model to file.

15. The method of claim 13, wherein the subsurface earth volume includes more than one region and specified training criteria are unique for each region.

16. The method of claim 13, wherein the rock-property values in the initial complete geologic model are perturbed by simultaneously optimizing more than one initial model.

17. The method of claim 13, wherein the frequency content of each tentative model is maintained during perturbation of the rock-property values.

18. A method for constructing a three-dimensional geologic model of a subsurface earth volume according to specific geological criteria, comprising the steps of:
   (a) specifying an initial geologic architecture to define the limits of the model, the regions within the model, and stratigraphic correlations within the model;
   (b) creating a three-dimensional array of contiguous model blocks to represent all portions of the subsurface earth volume to be included within the model;
   (c) assigning initial rock-property values to all model blocks in at least one initial frequency-passband model;
   (d) combining the initial frequency-passband models to form an initial complete three-dimensional geologic model of said subsurface earth volume;
   (e) specifying training criteria for the initial complete geologic model;
   (f) calculating statistics that describe the characteristics of the assigned rock-property values in the complete geologic model;
   (g) calculating the initial objective function;
   (h) perturbing the rock-property values in the complete geologic model so that the rock-property values more closely correspond to the training criteria;
   (i) calculating the objective function for the new tentative model;
   (j) retaining the perturbed rock-property values and the new tentative objective function if the objective function is reduced;
   (k) repeating steps (h) through (j) until the objective function is reduced to a specified limit; and
   (l) outputting the final complete geologic model to file.

19. The method of claim 18; wherein each rock property value is a measurable property of the subsurface volume selected from a group consisting of porosity, shale volume, net sand percent, net pore volume, hydrocarbon saturation, hydrocarbon pore volume, impedance, and permeability.

20. The method of claim 18, wherein an assigned rock-property value is consistent with the frequency content of the corresponding initial frequency-passband model.

21. The method of claim 18, wherein the initial complete geologic model is formed from a single initial frequency-passband model.

22. The method of claim 18, wherein the initial complete geologic model is formed by summation of all initial frequency-passband models.

23. The method of claim 18, wherein the initial complete geologic model is formed by weighted summation of the initial frequency-passband models in the frequency domain.

24. The method of claim 18, wherein the step of perturbing the rock-property values comprises a series of sequential steps, wherein each step attempts to force a nearly perfect fit of the model statistics to one of the training criteria.

25. The method of claim 24, wherein one of the steps includes replacing tentative rock-property values, in blocks intersected by the boreholes of wells, by corresponding values observed at each intersecting borehole segment.

26. The method of claim 24, wherein one of the steps includes replacing tentative rock-property values in all model blocks by resetting the tentative cumulative frequency distribution of a rock property to the desired cumulative frequency distribution of the property using a rank-transform method.

27. The method of claim 24, wherein one of the steps includes simultaneously perturbing rock property values in all blocks of the complete geologic model by replacing its tentative 3-D amplitude spectrum with a desired amplitude spectrum.

28. The method of claim 18, wherein at least one region is defined within the subsurface earth volume to be modeled and desired values for training criteria are unique for each region.

29. The method of claim 18, further comprising the step of providing a suitably programmed digital computer to perform one or more of steps (a) through (l).

* * * * *